Sept. 19, 1950  T. J. CLARY  2,522,814
BUCK RAKE AND STACKER
Filed Dec. 6, 1946  3 Sheets-Sheet 1

INVENTOR.
Thomas J. Clary
BY Victor J. Evans & Co.
ATTORNEYS

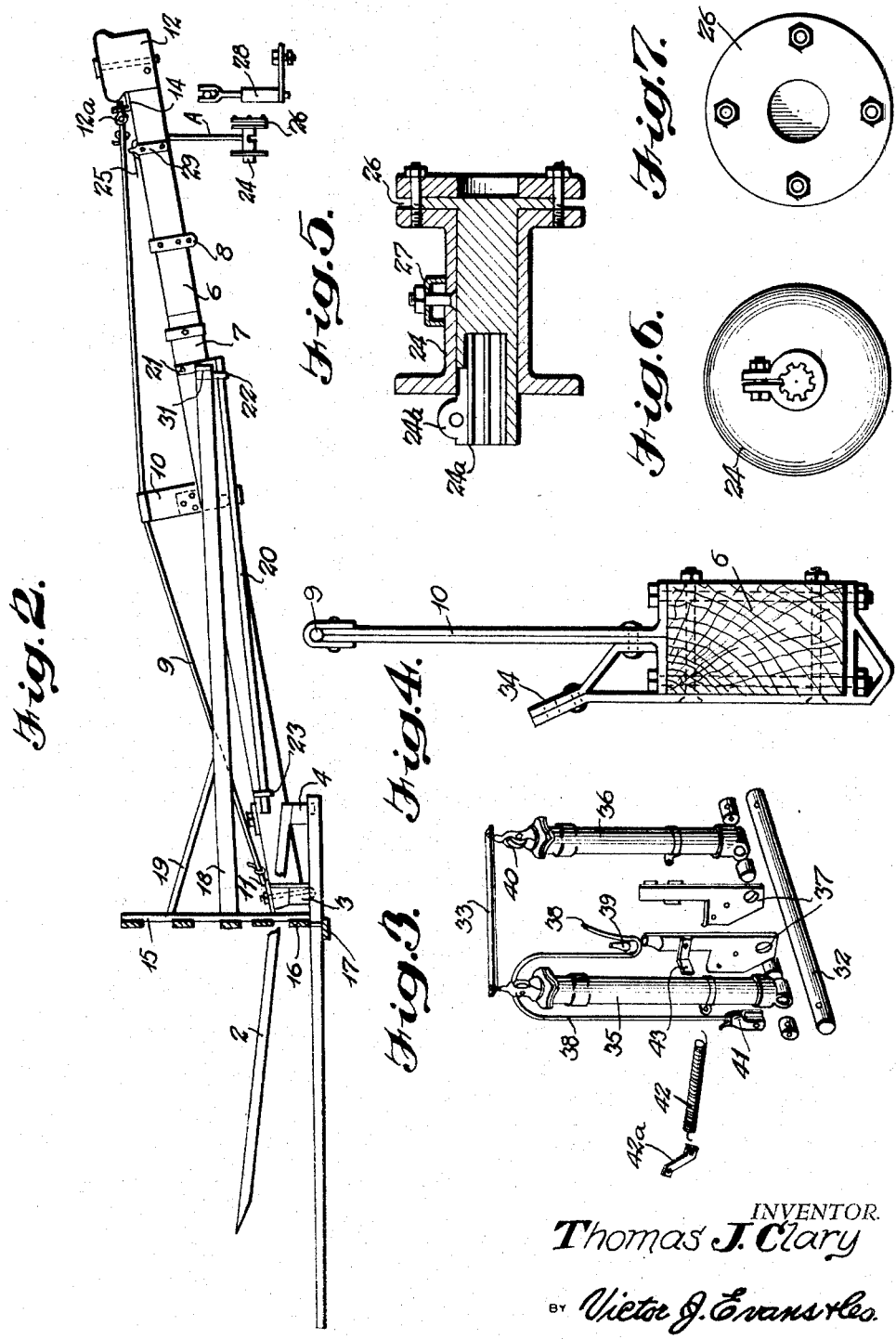

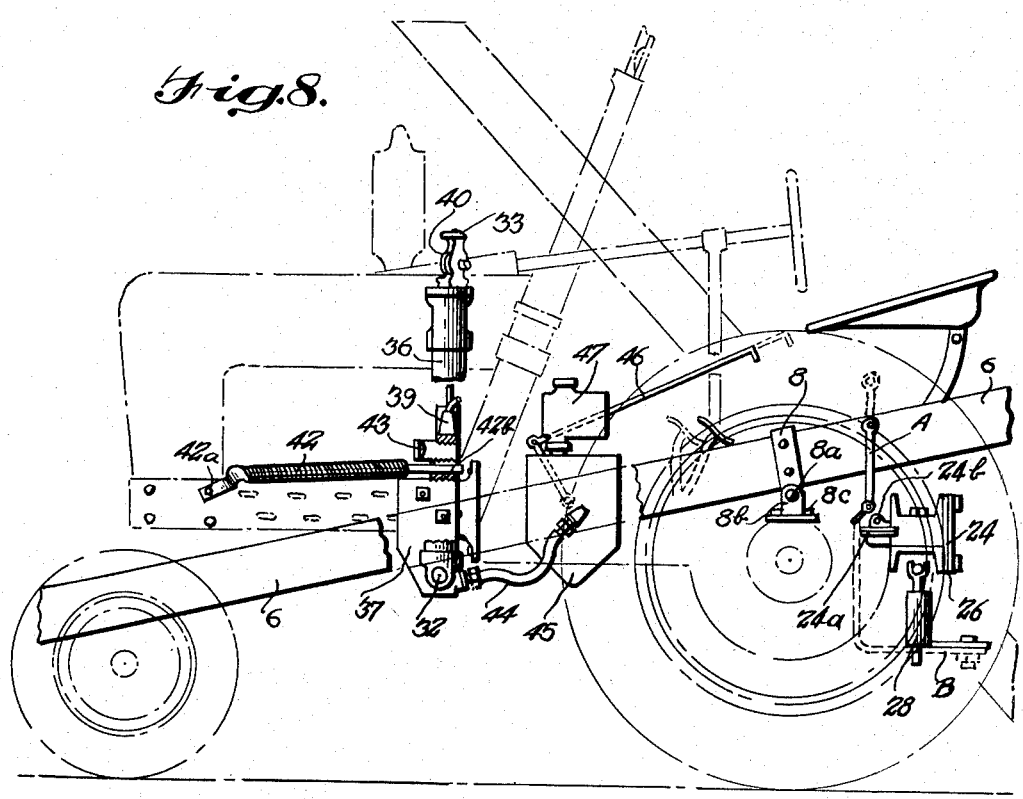
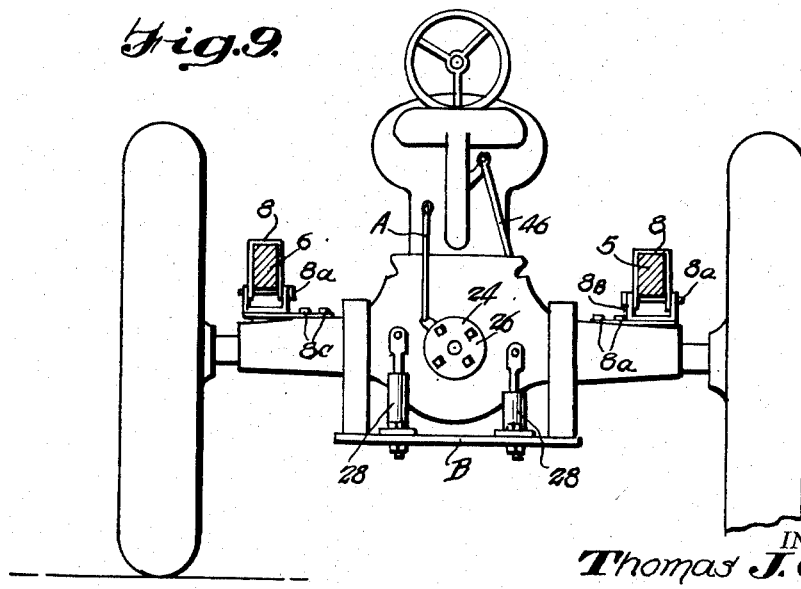

Patented Sept. 19, 1950

2,522,814

UNITED STATES PATENT OFFICE 2,522,814

BUCK RAKE AND STACKER

Thomas J. Clary, Sergeant Bluff, Iowa

Application December 6, 1946, Serial No. 714,529

4 Claims. (Cl. 214—82)

My present invention relates generally to the broad class of machines or implements for handling material, and more specifically to an improved buck rake and stacker of the power operated type employing an automotive vehicle or tractor and including a vertically swinging load carrier.

The primary object of the invention is the provision of a portable motor-operated implement by means of which a crop of hay may with facility be gathered from the field in succeeding loads, the loads may quickly be transported to a barnyard, or other desirable place, and there stacked with ease and convenience to an appropriate height.

The implement includes a minimum number of component parts that may with facility be manufactured at low cost of production and assembled with convenience to provide a unitary structure that may readily be pivotally mounted upon a high-speed tractor which propels the implement in gathering or raking loads in the field and in transporting the loads to a stack.

Power taken off the tractor is utilized in vertically swinging the horizontally pivoted implement after loading and in unloading, and power operated means are employed for pushing the load from the carrier in stacking operations.

The invention consists in certain novel combinations and arrangements of component parts involving hydraulic means for elevating the pivoted carrier, and means for actuating the load discharging means, as will hereinafter be described, and more specifically set forth in the appended claims.

In the accompanying drawings I have illustrated one complete example of a physical embodiment of the buck rake and stacker in which the parts are combined and arranged in accord with one mode I have devised for the practical application of the principles of my invention. It will, however, be understood that changes and alterations are contemplated and may be made in these exemplifying drawings and mechanical structures, within the scope of my claims without departing from the principles of the invention.

Figure 2 is a view in side elevation of the implement of Fig. 1.

Figure 3 is a perspective view of the hydraulic elevator which is supported on the tractor and activated with power therefrom for vertically swinging the combined rake and load carrier.

Figure 4 is an enlarged detail cross section of one of a pair of main frame bars of the implement showing a portion of the hydraulic lift or elevator.

Figure 5 is a detail view in longitudinal section of the take-off reel for the cable which activates the load discharger or push-off fence of the carrier;

Figure 6 is a view at the left end of the reel;

Figure 7 is an end view of the reel opposed to Figure 5;

Figure 8 is a side view showing the manner in which the invention is attached to a tractor and Figure 9 is a rear view of Figure 8.

Figure 1:
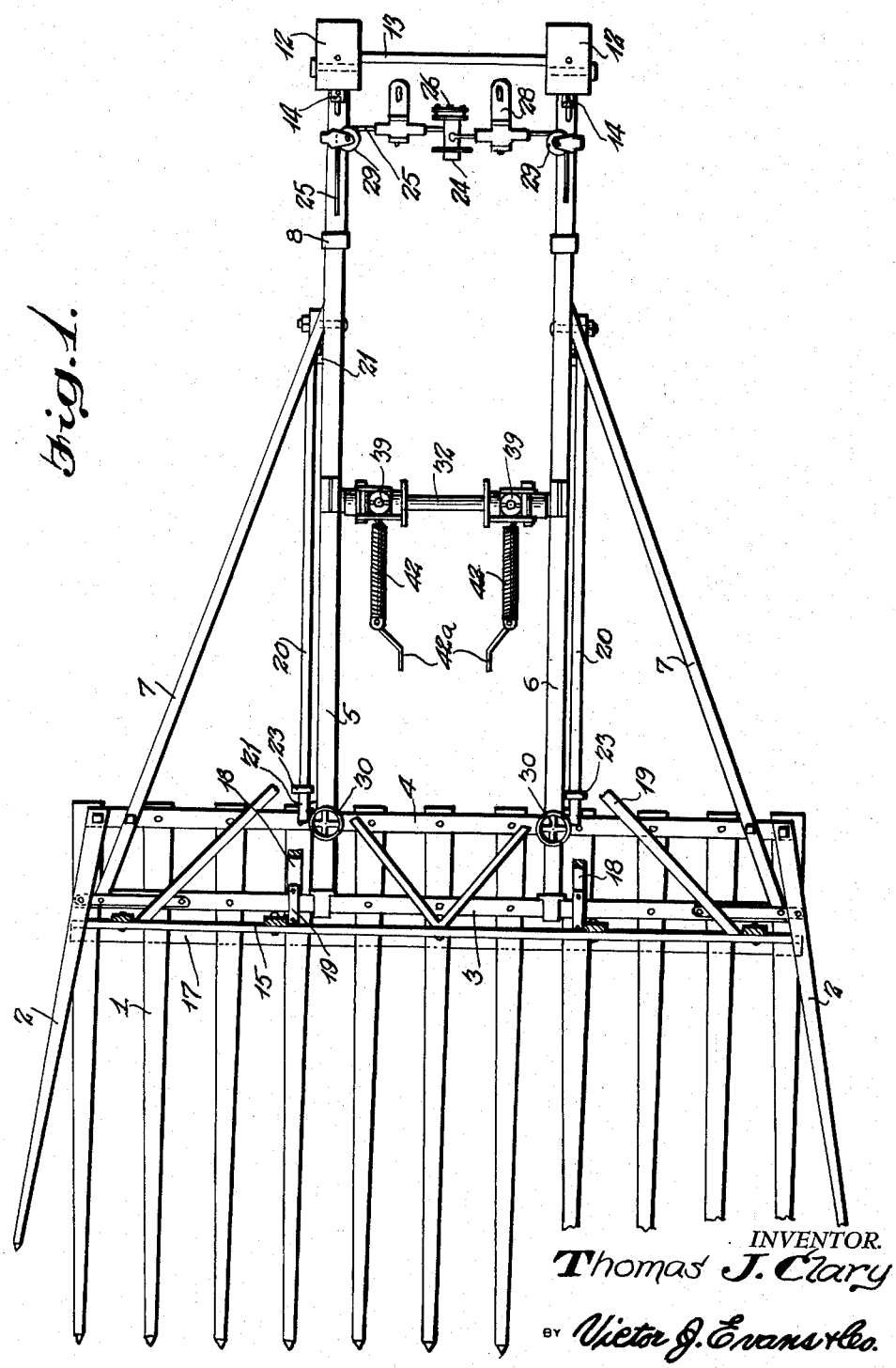
Figure 1 is a top plan view of an implement in which my invention is embodied, with parts being broken away for convenience of illustration.

In the preferred form of the invention, as shown in the assembly views, the haybuck, or combined rake and load carrier, includes a series or number of longitudinally extending and laterally spaced tines 1, together with two laterally out-spreading retaining tines 2, 2, that are slightly elevated above the plane of the horizontal tines 1, to prevent displacement of the load of hay as it is gathered in the field.

At their rear ends, the tines of the combined rake and load carrier are bolted and rigidly united with two spaced transverse sills 3 and 4, and the sills are bolted beneath the front ends of two laterally spaced and longitudinally extending main beams or bars 5 and 6.

A main frame of the implement is thus formed and provided with lateral oblique braces 7, 7, extending from the transverse sills 3 and 4, to be connected at the rear ends thereof adjacent the rear ends of the main bars 5 and 6 of the rake and load carrier, and beams or bars are pivotally mounted by means of L-shaped brackets 8 mounted on a transversely extending horizontal axis or pivot pin 8a mounted in the inverted U-shaped bracket 8b secured to the tractor or automotive vehicle at 8c, with the bars 5 and 6 disposed horizontally at opposite sides of the tractor or automotive vehicle when the implement is in lowered raking position. As thus pivotally mounted on the tractor, the tractor may be propelled to push the rake along the surface of the field for gathering a load, and then the loaded rake, as a carrier, may be swung upwardly on its pivotal support to position for carrying the load; and finally the load may be discharged from the carrier by unloading means operated by power from the tractor.

For reinforcing the main bars or beams 5 and 6 they may be trussed with cables 9, 9, suspended over posts 10, 10, with the front ends of the cables attached at 11 to the bars and their rear ends anchored to adjustable counterbalancing weights 12, 12 at 12a. The weights, which are connected by a cross bar 13, spaced from the rear end of the tractor, are fixed in adjusted counterbalancing position at 14, and the adjustable cross bar rigidly ties together the rear ends of the beams 5 and 6, leaving ample space within the beams for the vertical swinging movements of the combined rake and carrier in relation to the supporting tractor.

The combined rake and carrier for gathering and transporting a load of hay is equipped with an unloading fence or load discharger indicated as a whole by the number 15 which is initially located at the rear end of the rake while gathering a load, and while carrying the load, and which is moved forward toward the free end of the rake or carrier for discharging the load or unloading the hay from the elevated carrier to the hay stack. This pushing-off movement of the fence 15 is accomplished with power from the tractor and operating mechanism which projects the fence for unloading the hay, and then retracts the fence to its original or initial position at the rear end of the combined rake and carrier.

The fence 15 is held in upright position, or perpendicular to the plane of the tines 1 by means of an upper slide bar 16 and a lower slide bar 17 that are rigid with the fence and which extend transversely across the rake or carrier to perform the function of guides or slides as the fence is reciprocated along the rake or carrier. The transversely arranged fence or load-pusher is equipped with a pair of laterally spaced, longitudinally extending side bars 18, 18 rigidly attached to the fence and braced by oblique brace bars 19, and the side bars 18 extend along the outer sides of the main beams 5 and 6, toward the rear, and parallel with the beams, for relative movement of the unloader.

For supporting the side bars 18 of the fence in their reciprocating movements, each side bar is provided with a guide rod 20, which is rigidly attached by brackets 21 to the outer sides of the beams 5 and 6, and the rear end of each side bar 18 is equipped with a slide bracket 22 adapted to slide along the guide rods 20. At the front end of each guide rod 20 a spring device 23 is associated with a supporting bracket 21 to absorb shocks of impact as the slide bracket 22 reaches the end of its forward movement in discharging a load.

Reciprocating movement is imparted to the push-off fence or unloader 15 by means of power taken off the tractor, through the medium of a rotary reel or drum 24 and endless cable 25, and the drum shown is equipped with a reversing clutch 26 of the friction type, which is adapted to automatically slip for reversing movement as the unloader reaches the end of its working and retracting strokes.

The drum or reel 24 is mounted on the tractor between the two main beams 5 and 6 on a longitudinally extending axis, and the splined end of the power take-off shaft is inserted in the splined end 24a, and a bolt in the apertured ears 24b will, when tightened, retain the end 24a on the power take-off shaft. The hand lever A, as shown, is the controlling medium for the power take off. The cable ends are attached to the drum at 27 from which the two flights of the cable extend laterally to and through slotted guide brackets 28 mounted on the tractor draw-bar B. The slots of the guide brackets are of ample height to compensate for pivotal movement of the implement, and the two flights of the cable pass through these brackets and then around guide pulleys 29, 29, journalled near the rear ends of the two beams 5 and 6.

From the rear guide pulleys 29, the two flights of the cable extend froward along the upper faces of the beams to and around a front pair of guide pulleys 30, 30, journalled on the beams, and from these front guide pulleys the flights of the cable return rearwardly and are attached at 31, 31 to the rear ends of the side arms 18. Thus the power operated drum is adapted to wind the two flights of the cable for projecting the push-off fence or hay unloader while the carrier with its load is in elevated position over the front end of the tractor. The upward swing of the carrier and its load is limited, and its maximum swing is short of a position perpendicular to the tractor; therefore, after the load has been pushed off the inclined carrier, the reversing clutch of the reel or drum permits a gravity return of the combined rake and carrier, under contol of mechanism handled by the driver of the tractor, and the push-off fence or unloader is restored to operative position at the rear end of the carrier.

In the raking or gathering position of the implement in Figure 2, the combined rake and carrier is disposed close to the ground for gathering a load of hay; then the loaded carrier is lifted or elevated for transportation of the load, and if necessary the loaded carrier is further lifted for discharging the load. The two beams 5 and 6 are pivotally mounted, as previously stated, on the rear axle of the tractor, and hydraulic power taken off the tractor is applied to the two beams at a suitable point between the pivotal mount of the implement and the loaded carrier for raising the carrier end of the appliance.

For this purpose, a suitable hydraulic lifting mechanism of the tubular telescopic type, under manual control of the driver of the tractor, is indicated in Figure 3, where the axle 32 is mounted transversely of and supported on the tractor. At the upper end of the hydraulic mechanism, a transversely arranged pivot bar 33 is mounted at its ends in brackets 34 (Figure 4) that are rigidly mounted on the respective beams 5 and 6, and the telescoping tubes 35 and 36 of the hydraulic lift provide a flexible connection between the axle 32 on the tractor and the pivot bar 33 on the beams 5 and 6 of the main frame of the implement.

In Figures 3 and 8, the axle 32 of the hydraulic mechanism is mounted in brackets 37, 37 fixed to the frame of the tractor, and the pull cables 38, 38 from suitable actuating mechanism of the tractor pass under guides 39 of these brackets, thence upwardly and over pulleys 40 to anchoring brackets 41 connected with the respective telescoping tubes of the hydraulic lift. Under control mechanism manipulated by the driver, the hydraulic mechanism lifts the loaded carrier or forward end of the implement to upwardly inclined position, and while under control of the driver, the elevated carrier, when unloaded, is permitted to swing down to raking position, or to position for transportation.

Springs 42 are connected at their ends to a fixed bracket 42a on the tractor and to the hydraulic tubes, at 42b, and seats or rests 43 are mounted on the brackets 37, to hold the cylinders of the hydraulic lift in rigid position when the rake is bucking or gathering a load of hay on the carrier.

In mounting the implement on the tractor, the pivotal point 8a of the beams 5 and 6 is preferably located over the rear axle of the tractor, and the lift of the twin-cylinders of the hydraulic mechanism is applied at the approximate longitudinal center of the counterbalanced carrier, so that the weights lighten the load on the cylinders and reduce strains on the mounting brackets of the hydraulic mechanism.

The cross bar 13 between the counterweights resists the pull of the unloader cables as the load is pushed off the carrier; and the twin-cylinder hydraulic lift serves to cushion the implement against jolts occasioned by high speed of the tractor over rough roads or ground; and the axle 32 also performs the functions of a push bar to absorb side-sway of the implement as the rake is gathering hay from the field.

In mounting the implement upon the tractor, the hydraulic lift and axle, the brackets and springs are bolted or otherwise attached to the tractor frame, as shown, and the hoses 44 are attached to a hydraulic power lift 45 of the tractor, which is operated by the control rod 46. Since the power lift does not contain sufficient fluid to efficiently operate the mechanism, an auxiliary tank 47 is mounted thereon to increase the fluid capacity of the lift. After the tractor has been driven in between the main beams 5 and 6 of the implement, the pivot bolt 8a is mounted in its bearings at 8b, and the pull cables 38 are attached to the two beams at 34. The push-off or unloading drum is rigidly connected to the power take-off shaft of the tractor, as previously described, and the cable guides of the unloader are adjusted in place and anchored to the draw bar B of the tractor, after which the cross bar 13 at the rear end of the implement is adjusted and tightened in fixed position.

There has thus been provided, a device of the character described, which it is believed will accomplish the objects of the invention.

It is also believed that from the foregoing description, the operation and construction of the invention will be apparent to those skilled in the art, and it is to be understood that changes in the minor details of construction, arrangement and combination of parts may be resorted to, providing they fall within the spirit of the invention and the scope of the appended claims.

Having thus fully described my invention, what I claim as new and desire to secure by Letters Patent is:

1. In a tractor-propelled combined hay rake and carrier of the vertically swinging type and including a pair of beams pivotally mounted at the center of each beam on the tractor, the combination with means for lifting the beams and loaded carrier, and counterbalancing means on the rear ends of the beams to counterbalance the hay rake and carrier on the front end of said beams of a transversely arranged push-off fence slidably mounted on the carrier, and power operated means for actuating the fence to discharge a load from the carrier.

2. In a tractor-propelled combined hay rake and carrier of the swinging type including a pair of beams and means for pivotally mounting the beams at the center thereof on a tractor, the combination of a transversely arranged fence slidably mounted on the carrier and provided with a pair of rearwardly extending side arms, guide rods mounted on the beams and slides mounted on the side arms for co-action with said rods, power operated means for vertically swinging the loaded carrier, counterbalancing means on the rear ends of the beams for balancing the load carrier through its swinging movement and power operated means for actuating the side bars for discharging a load of hay from the carrier.

3. In an implement as described, the combination with a combined hay rake and carrier of the vertically swinging type and including a pair of longitudinally extending laterally spaced beams, counterbalancing means on the rear end of said beams for said hay rake and carrier and operating means for the carrier, of a transversely arranged fence slidably mounted on the carrier, a pair of guide rods mounted at the outer sides of the beams, a pair of rearwardly extending side bars rigid with the fence and slides mounted on the side bars for co-action with the rods, a pull cable operatively mounted on the beams and attached to the side arms, a drum for winding the cable, and means for operating the drum to discharge a load from the carrier.

4. In an implement as described for use with a tractor, the combination with a vertically swinging combined rake and carrier and means for pivotally mounting the carrier on a tractor, lifting mechanism mounted on the tractor for elevating the front end of the implement and means for counterbalancing the rear end of the implement, a reciprocable push-off fence slidably mounted on the carrier and rearwardly extending side bars rigid with the fence, a pair of guide rods rigid with the implement and slides on the side bars for co-action with the rods, a pull cable operatively mounted on the implement and connected with the side arms, and a power-operated drum for winding the cable to impart a discharging movement to the push-off fence.

THOMAS J. CLARY.

REFERENCES CITED

The following references are of record in the file of this patent:

UNITED STATES PATENTS

| Number | Name | Date |
|---|---|---|
| 2,311,523 | Cope et al. | Feb. 16, 1943 |
| 2,397,045 | Richey | Mar. 19, 1946 |
| 2,398,964 | Rogers et al. | Apr. 23, 1946 |
| 2,403,808 | Laughead | July 9, 1946 |
| 2,456,879 | Kucera | Dec. 21, 1948 |
| 2,468,424 | Brauch | Apr. 26, 1949 |
| 2,493,397 | Fourman | Jan. 3, 1950 |